UNITED STATES PATENT OFFICE.

JOSIAH S. ELLIOTT, OF CHELSEA, AND JOHN F. WOOD, OF EVERETT, MASS.

IMPROVEMENT IN INKSTANDS FROM COMPOSITION STONE.

Specification forming part of Letters Patent No. 128,218, dated June 25, 1872.

SPECIFICATION.

*To all whom it may concern:*

Be it known that we, JOSIAH S. ELLIOTT, of Chelsea, in the State of Massachusetts, and JOHN F. WOOD, of Everett, in said State, have invented a Composition-Stone Inkstand; and we do hereby declare the following to be a full and correct description of the same.

The object of this invention is to make of composition stone, in imitation of marble and similar costly stones, a base or stand for holding the ink cup or bottle.

We select materials for the stand and put them together, molding or tamping them to the required shape or form in the manner directed in Letters Patent of the United States No. 124,557, granted to us March 12, 1872, for improvements in the manufacture of imitation-marble, and afterward marble the stone thus prepared in the manner further indicated in said patent.

The mold is so constructed as to form in the stone a receptacle for one or more cups or bottles, as may be desired, and may also, if desired, be so constructed as to produce in the stone a trough for pens, a place for a sand-box, &c.

We claim—

As a new article of manufacture, an inkstand in imitation of marble, prepared substantially as described.

The above specification of our said invention signed and witnessed at Boston this 22d day of May, A. D. 1872.

J. S. ELLIOTT.
JNO. F. WOOD.

Witnesses:
WILLIAM W. SWAN,
SAM. W. BATES.